April 9, 1935.  M. MADSEN ET AL  1,997,065
AUTOMATIC WEIGHING DEVICE FOR PAVING PLANTS
Filed Aug. 24, 1931  6 Sheets-Sheet 4

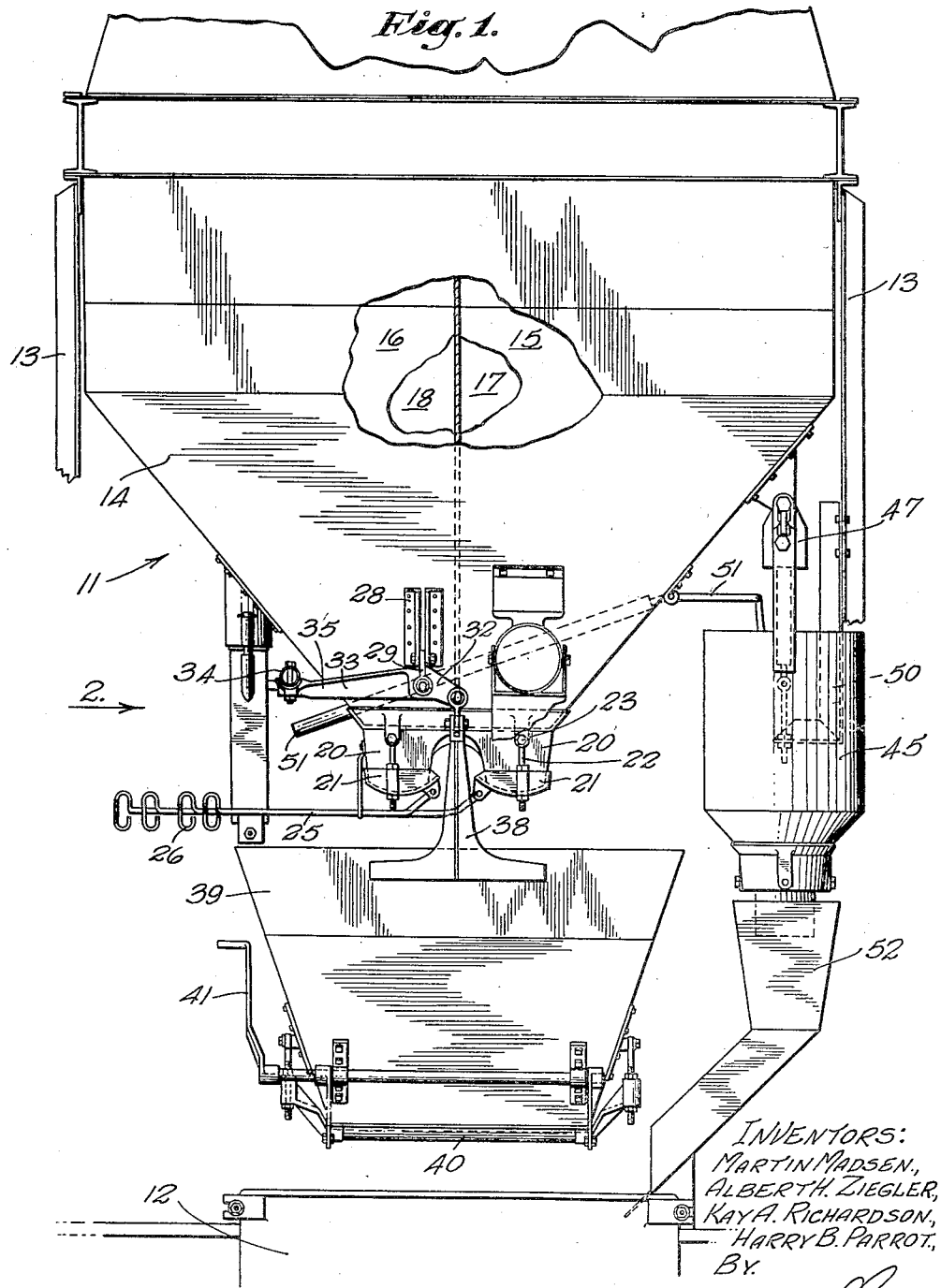

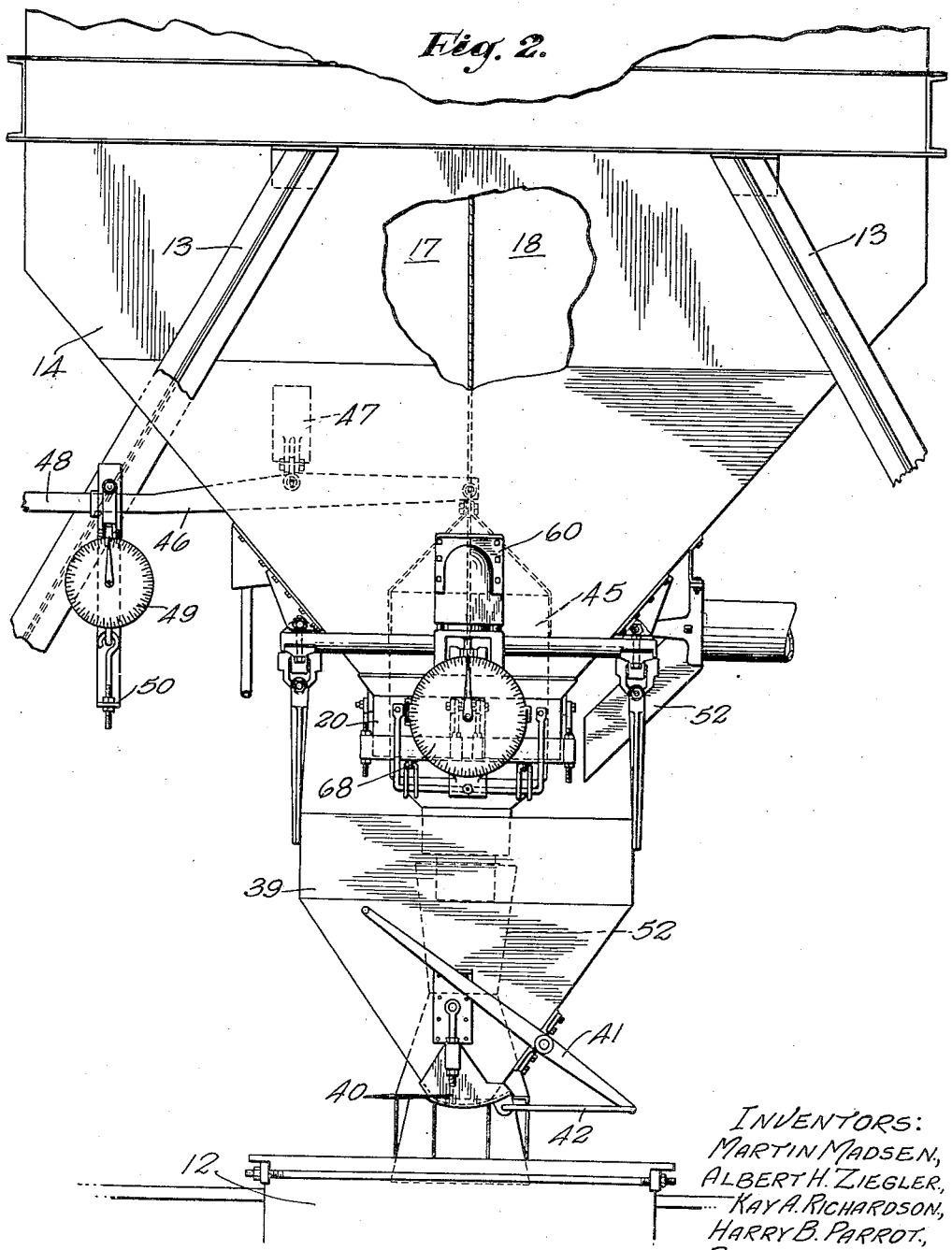

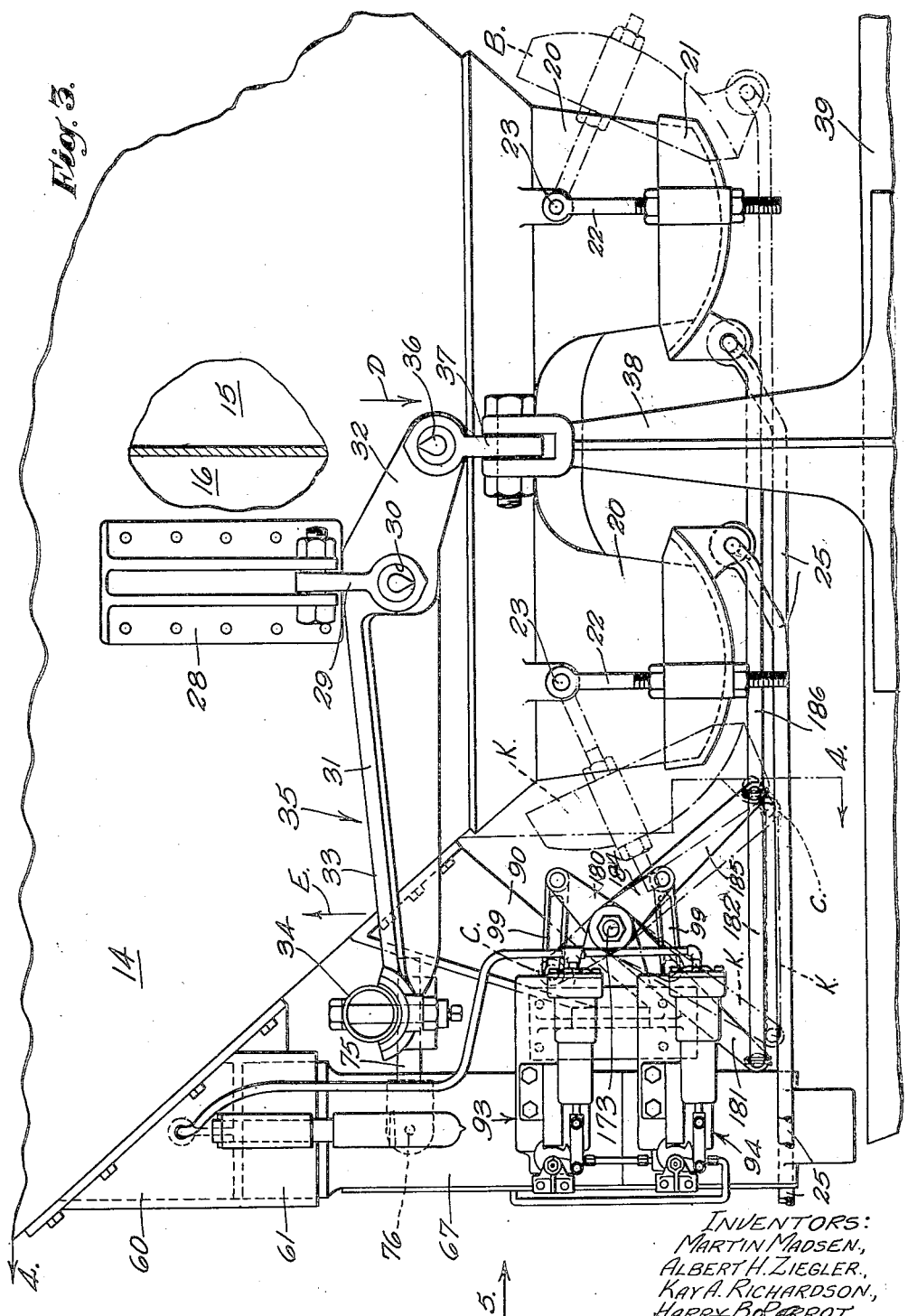

INVENTORS:
MARTIN MADSEN,
ALBERT H. ZIEGLER,
KAY A. RICHARDSON,
HARRY B. PARROT
BY
ATTORNEY.

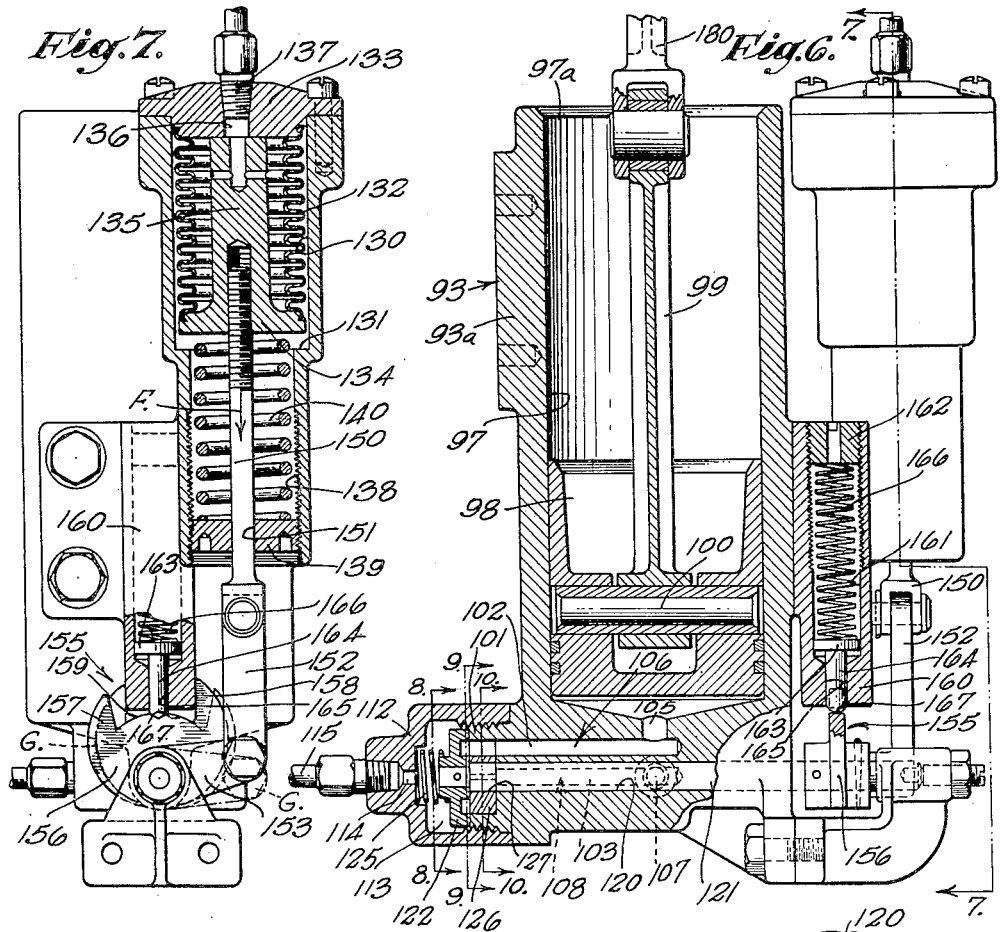

Patented Apr. 9, 1935

1,997,065

UNITED STATES PATENT OFFICE

1,997,065

AUTOMATIC WEIGHING DEVICE FOR PAVING PLANTS

Martin Madsen, Albert H. Ziegler, Kay A. Richardson, and Harry B. Parrot, Huntington Park, Calif., assignors to Madsen Iron Works, Ltd., Huntington Park, Calif., a corporation of California Application August 24, 1931, Serial No. 558,955

16 Claims. (Cl. 249—14)

Our invention relates to weighing devices, and more particularly to an apparatus for weighing aggregates for cement concrete, asphaltic cement concrete, and for the proportioning of materials in various lines of manufacture, such, for example, as the making of glass.

Devices for weighing materials in mixing cement and asphaltic concrete as ordinarily used are manually operated. These devices, while more reliable than known methods of proportioning by volume, are subject to human error.

It is important in mixing aggregates for the above-named products that the many variables in sand, rock, and gravel be reckoned with to insure continued uniformity in the composition of the product over long periods.

It is with the above important features in view that we have designed our automatic weighing device which has for its primary object the provision of automatic apparatus for individually weighing a plurality of materials successively delivered from a plurality of bins into a weigh-hopper to form an aggregate suitable for subsequent mixing to form a certain product, such as asphaltic cement.

It is another object of our invention to provide an automatic weighing device which includes a plurality of aggregate bins, each of which has a gate member positioned for delivering material from the bin into a weigh-hopper, the weigh-hopper being suitably supported by the weigh-beam of a scale, in such a manner that the weight of the material delivered from the bins is registered through the weigh-beam on the scale.

It is another object of our invention to provide in a device of the character described in the above paragraph means for successively opening and closing the gate members of the various bins so that the weight of the material delivered from each bin during the period that each gate is open is separately registered on the scale.

It is another object of our invention to provide automatic means for closing the gate member of each bin when the weight of the material delivered therefrom reaches a certain predetermined weight.

It is another object of our invention to provide means operable to allow only one of the gate members to be opened at one time.

It is another object of our invention to provide automatic means for locking all of the gate members in closed position and automatically operated means for successively releasing the locking means to allow each of the gate members to be opened and closed.

It is another object of our invention to provide automatic means for locking each of the gate members in its open position during the period in which the material is flowing therefrom, this locking means being automatically releasable when the weight of the material delivered from the gate member reaches a predetermined weight.

It is another object of our invention to provide means for stopping the operation of the weighing device should the material cease to flow through any one of the gate members before the required amount of material has been delivered therethrough, the gate member remaining open until the deficiency has been made up by supplying more material to that particular bin.

It is another object of our invention to provide an automatic controlling means for opening and closing the gate members, which controlling means is capable of proportioning the aggregate in four different mixes, any one of which can be delivered between batches at the option of the operator in charge.

It is another object of our invention to provide automatic means for preventing the operation of the device after one complete batch of the aggregate has been delivered to the weigh-hopper until the weigh-hopper has been emptied and is in readiness for another batch.

It is another object of our invention to provide manual control means for operating the automatic gate opening and closing means so that the sequence of weighing the aggregate is at the option of the operator.

There are other objects which will be made evident in the following part of the specification and the appended claims, which might be more clearly understood with reference to the accompanying drawings.

Referring to the drawings,

Fig. 1 is a side elevational view of the automatic weighing device, showing the included aggregate hopper, the weighing device, and the weigh-hopper, in combination with an asphalt mixing plant which includes a separate weighing device for hot asphalt.

Fig. 2 is an end elevational view of the device taken as indicated by the arrow 2 of Fig. 1.

Fig. 3 is a greatly enlarged fragmentary elevational view of the central portion of Fig. 1 showing the gate operating mechanism of the device.

Fig. 4 is a vertical sectional view taken as indicated by the line 4—4 of Fig. 3.

Fig. 6 is a sectional view taken through one of the gate operating elements of the invention, this view being taken as indicated by the line 6—6 of Fig. 5.

Fig. 7 is a sectional view through the pressure chamber of one of the operating elements, this view being taken as indicated by the line 7—7 of Fig. 6.

Figure 5:
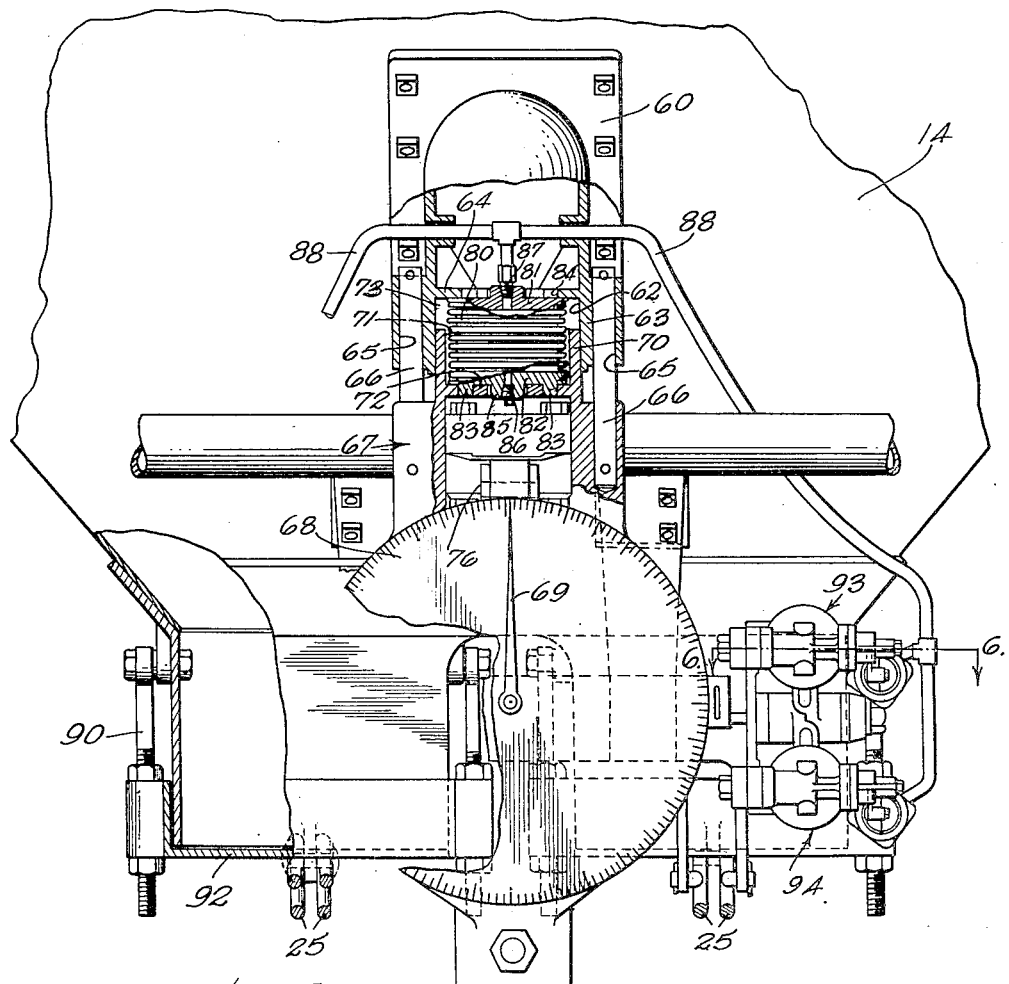
Fig. 5 is an elevational view, partly in section, taken as indicated by the arrow 5 of Fig. 3.

Figs. 8, 9, and 10 are respectively fragmentary sectional views taken as indicated by the lines 8—8, 9—9, and 10—10 of Fig. 6.

Fig. 11 is a schematic flow diagram illustrating the operation of the control mechanism and the gate operating mechanism of the invention.

Referring particularly to Figs. 1, 2, and 3, we show a mixing plant, suitable for the production of asphaltic cement generally designated by the numeral 11. The mixing plant 11 includes a mixing device indicated by the numeral 12, above which is supported by a suitable framework 13 an aggregate hopper 14. The aggregate hopper 14 comprises a plurality of separate bins, the number of which depends upon the number of aggregates necessary to form a desired product. In the drawings we have shown four of the bins 15, 16, 17, and 18. Each of these bins is provided with a delivery chute 20 through which material from the respective bins is adapted to flow by gravity. The delivery chutes are arranged in pairs, for convenience and conservation of space, the chutes 20 of the bins 15 and 16 being aligned in the same vertical plane, and the chutes 20 of the bins 17 and 18 being aligned in the same vertical plane when viewed as in Fig. 1.

Normally closing each of the delivery chutes 20 is a gate member 21. Each of the gate members 21 is hinged to one of the chutes 20 by a rod 22 extending upwardly from each side of the gate, the upper ends of the rods 22 being pivoted to each side of the chute 20, as shown at 23, in such manner that the gates are capable of being swung outwardly to open the chute 20. The gates 21 closing the delivery chutes 20 of the bins 18 and 16 are adapted to be swung in a leftward direction as viewed in Fig. 1, while the gate members 21 associated with the bins 17 and 15 are adapted to be swung rightwardly as viewed in Fig. 1.

Pivotally connected to each of the gate members 21 is a rod 25 extending to a remote point, and each rod being provided with a gripping portion 26 provided for the manual operation thereof.

It is, of course, understood that this feature, as well as the number, relative positions, and details of construction of the gate members, is immaterial, inasmuch as various types of gate members, together with various means for opening these gates, could be used without departing from the broad concept of the invention.

Supported on each side of the aggregate hopper 14 in the manner shown, by a suitable bracket 28, is a weigh-beam hanger 29, each providing a bearing 30 adapted to fulcrum a weigh-beam arm 31 on each side of the hopper 14 as shown. Each of the weigh-beam arms 31 is provided with a load end 32 extending inwardly on one side of the fulcrum 30 to a point approximately midway between the chutes 15 and 16 and 17 and 18, and having a lever end 33 extending outwardly on the other side of the fulcrum 30 to a point beyond the end of the hopper 14, as shown. Extending laterally between the extreme outer ends of the lever ends 33 of the arms 31 is a cross member 34 which is rigidly bolted, as shown, to the arms 31, the arms 31 and the cross member 34 cooperating to form the weigh-beam 35 of the device.

Journalled by suitable bearings 36 to the load ends of the weigh-beam 35 on each side of the hopper 14 is a hanger 37 to which is secured by brackets 38 a weigh-hopper 39. The weigh-hopper 39 is supported by the weigh-beam 35 in a position to receive, by gravitational flow, material from the bins 15, 16, 17, and 18 when their respective gates 20 are opened. The weigh-hopper 39 is provided with gate means in the form of a hinged gate 40, similar to the gate members 21 of the delivery chutes 20. The gate 40 is manually operated by a lever 41 pivoted to the weigh-hopper 39 and connected to the gate 40 by a link 42 in the manner shown. As will be seen, the gate 40 of the weigh-hopper is positioned directly over the mixing device 12, so that the material may be delivered from the weigh-hopper by gravitational flow into the mixing device.

As shown in Figs. 1 and 2, a hot asphalt bucket 45 is suspended by a weigh-beam 46, suitably fulcrumed to a bracket 47, secured to the aggregate hopper 14 as shown. The lever end 48 of the weigh-beam 46 is connected to the operating mechanism of a suitable dial scale 49 which in turn is connected to a bracket 50 secured to the framework 13 in such a manner that the weight of the hot asphalt delivered to the bucket 45 is registered on the scale 49 in a well known manner.

The bucket 45 is provided with a suitable valve or gate means (not shown) manually operable by a lever 51 which is shown as extending to a point adjacent the operating rods 25. The bucket 45 is preferably incased by a steam jacket (not shown) adapted to maintain the temperature until the proper time for delivering into the mixing device. A spreader 52 is suitably supported under the bucket 45 and is adapted to distribute the asphalt from the bucket 45 into the mixer in such a manner as to facilitate the mixing of the material therein.

Coming now to a description of the more pertinent parts of our invention, with particular reference to Figs. 3, 4, and 5, we show a bracket member 60 fixedly secured to the hopper 14 adjacent the cross member 34 of the weigh-beam 35. The bracket 60 has a depending portion 61 which provides an inverted cup-shaped depression 62 having an annular side wall 63 and a top wall 64. The bracket 60 is also provided with a vertically extending bore 65 on each side of the depression 62, the axes of these bores being parallel to the axis of the depression 62. Slidably positioned in the bores 65 is a pair of posts 66 which extend upwardly through the bores 65 and are provided with laterally extending pins in the upper ends thereof, as shown, to limit the downward movement thereof relative to the bores 65. Fixedly secured to the lower ends of the posts 66 is a spring housing 67 adapted to contain the operating mechanism of any suitable type of scale. Provided on the outer face of the housing 67 is a suitably graduated scale dial 68 and projecting through the center thereof is a shaft carrying an indicator 69 in the usual manner. Formed on the upper part of the housing 67 is an upstanding annular wall 70 which is slidable within the annular wall 63 and forms a cup-shaped depression 71 having a lower wall 72 which, together with the inverted depression 62, forms an expansible chamber 73. Rigidly secured by any suitable means to the central portion of the cross member 34 is an outwardly extending rod 75 which is pivotally connected as indicated at 76 to the operating mechanism of the mentioned scale in such a manner that the scale housing 67 moves vertically relative to the bracket member 60, decreasing and increasing the height of the chamber 73 and rotating the indicator 69 relative to the scale dial 68 to indicate various weights as the lever end 33 of the weigh-beam raises and lowers subject to the increase and decrease of the weight of the material in the weigh-hopper 39.

Confined within the expansible chamber 73 is a sylphon bellows 80 of a well known type, which, for purposes of description, we will hereinafter term the master sylphon. Provided on the upper and lower end plates 81 and 82 of the master sylphon 80 are a plurality of lugs 83 which extend through openings 84 in the plates 81 and 82, these lugs and the associated openings being provided for the purpose of maintaining the sylphon in its proper spaced relationship relative to the walls of the expansible chamber 73. The end walls 81 and 82 of the master sylphon 80 are preferably interchangeable for convenience of assembly, and each is provided with a central boss 85 having an axial threaded opening therethrough which communicates with the interior of the bellows of the sylphon. The opening in the lower end plate, such as the plate 82, may be closed with a plug 86, and threaded into the opening in the upper plate 81 is a nipple 87 which, in turn, is connected to a supply pipe 88 in the manner shown in Figs. 4 and 5, for a purpose to be hereinafter described.

Secured to the aggregate hopper 14 adjacent the scale housing 67 is a pair fo depending brackets 90 and 91. Fixedly supported by the brackets 90 and extending at right angles thereto is a supporting member 92. Rigidly bolted to each of the suitably formed outer ends of the supporting member 92 is a pair of gate operating elements generally designated by the numerals 93 and 94, and 95 and 96, respectively. All of these operating elements are identical in form and details of construction, and for the purpose of simplicity we will describe the construction of one of the elements, such as the element 93, singly, with reference to Figs. 6 to 10, inclusive.

The gate operating element 93 includes a casing 93a in which there is formed a cylinder 97 having an open end 97a in which a piston 98 is adapted to reciprocate. The piston 98 is provided with a connecting rod 99 secured to the piston by any suitable means such as a wrist pin 100 of the type shown. The connecting rod 99 is adapted to extend outwardly through the open end of the cylinder as the piston 98 is reciprocated.

Formed in the rearward end of the casing 93a adjacent the closed end of the cylinder is an outwardly extending projection 101. Formed in the projection 101 are three suitably spaced, parallel bores 102, 103, and 104. These bores extend inwardly from the outer end of the projection 101 to a point adjacent the center of the cylinder 97 and with their axes disposed at right angles to the axis of the cylinder. One of the bores, such as the bore 102, is connected to the cylinder 97 by a laterally extending opening 105 to form a fluid passage 106 communicating with the cylinder. Another of the bores, such as the bore 103, is connected at its inner end with a laterally extending bore 107 extending to the exterior of the casing 93a and which, together with the bore 103, forms a discharge port 108. The remaining bore, such as the bore 104, is connected at its inner end with a lateral bore 109 extending to the exterior of the casing 93a, and which, together with the bore 104, forms a relay duct 110 of the invention. Threadedly secured to the outer end of the extension 101 is a cap member 112, the inner surface of which is spaced from the outer end of the extension 101 and cooperates therewith to form a closed valve chamber 113 communicating with the outer ends of the bores 102, 103, and 104. Provided in the cap 112 is a fluid inlet orifice 114 communicating with the valve chamber 13, and communicating with the orifice 114 is a threaded opening for the reception of a nipple included in a steam delivery manifold 115.

Formed coaxially with the extension 101 and parallel to the bores 102, 103, and 104, is a bore 120 extending from the valve chamber 113 through the casing 93a to the exterior thereof at the opposite side. Journalled in the bore 120 and extending into the valve chamber 113 is a valve shaft 121 to which is keyed a valve member 122 adapted for rotational movement within the chamber 113.

The valve member 122 is preferably in the form of a circular disc from which a peripheral segment is cut away to form a peripheral notch 123 extending substantially 90° around the circumference thereof. Formed on the inner surface of the valve 122 is a partially circular channel 124, the ends of which terminate at points closely adjacent the notch 123.

As will be clearly seen by inspecting Figs. 8 and 9, the relationship between the notch 123, the channel 124, and the bores 102, 103, and 104, is such that when the valve member is in its normal position, shown in solid lines in Figs. 8 and 9, the fluid passage 106 is in communication with the discharge port 108 through the channel 124, and the fluid inlet orifice 114 is in communication with the relay duct 110 through the chamber 113 and the notch 123, there being no communication possible between the channel 124 and the chamber 113 due to the manner in which the peripheral portion of the inner surface of the valve member seats against the outer surface of the projection 101. A compression spring 125 may be positioned in the valve chamber 113 between the valve member 122 and the cap member 112, in the manner shown, to compress the valve member tightly against the projection 101.

In order to reduce the width of the bores 102, 103, and 104 at the outer ends thereof, an apertured element 126 may be optionally provided in the manner shown.

The outer surface of the extension 101 may be counterbored to receive the element 126 which is provided with a bore 127 adapted for coaxial alignment with the bore 120 and through which the shaft 121 extends. The element 126 is provided with three peripheral slots 128 adapted for coaxial positioning relative to the bores 102, 103, and 104 to provide restricted continuations thereof.

Adjacent the cylinder 97 formed either integrally in the casing 93a or formed in a separate casting secured thereto, is a pressure chamber 130, the longitudinal axis of which is parallel to the axis of the cylinder 97. The diameter of the lower portion of the pressure chamber 130 is reduced to form an annular shoulder 131. Positioned above the shoulder 131 is a sylphon bellows 132 of a well known type, having an outer end plate 133 which is secured to and closes the outer end of the chamber 130, as shown. The sylphon 132 is also provided with an inner end plate 134 which is movable within the chamber 130 as the bellows portion of the sylphon 132 expands and contracts. The end plate 134 is provided with a central projection 135 adapted to contact the inner face of the outer end plate to limit the contraction of the sylphon, the expansion thereof being limited by contact between the inner end plate 134 and the annular shoulder 131. The outer end plate is provided with an opening 136 threaded to receive a nipple 137 which in turn is adapted for connection to the supply 88. The lower open end of the chamber 130 is internally threaded, as shown at 138, to receive an adjustment nut 139. Confined between the nut 139 and the outer face of the inner end plate 134 of the sylphon 132, is a compression spring 140. This spring 140 and adjustment nut 139 are provided for the purpose of providing a variable resistance to the expansive action of the sylphon 132 to cause the sylphon to respond to various pressures, the degree of resistance set up by the spring against the sylphon being varied by the adjustment of the nut 139.

Threadedly connected to the inner end plate of the sylphon is an arm 150 which extends through and is slidable in a central opening 151 in the nut 139. Connected to the outer end of the arm 150 by a link 152 is a crank 153 which in turn is keyed or otherwise secured to the outer end of the valve shaft 121, the arm 150 and the associated link and crank being operable to rotate the valve shaft 121 as the sylphon 132 expands and contracts.

Associated with the valve shaft 121 is a valve tripping mechanism 155 which includes a trip member in the form of a disc 156 secured to the shaft 121, and having a portion of the periphery thereof cut away, as best shown in Fig. 7, to provide a pair of spaced finger portions 157 and 158 and an arcuate surface 159 concentric with the axis of the shaft 121. The finger portions extend on each side of a boss 160 formed integrally with the casing 93a, the axis thereof being parallel with the axis of the cylinder 97 and the chamber 130 and perpendicular to the longitudinal axis of the shaft 121. The finger portions are adapted for alternate contact with the boss 160 for the purpose of limiting the rotational movement of the valve 122. Formed in the boss 160 is an axial bore 161 having an open end. The upper portion of the bore 161, including the open end, is internally threaded to receive a nut 162. Slidably positioned in the bore 161 is a plunger 163 having a pin 164 which projects outwardly through an opening 165 in the closed end of the bore adjacent the arcuate surface 159. Confined between the nut 162 and the plunger 163 within the bore 161 is a compression spring 166 adapted to constantly resiliently force the pin 164 outwardly. Provided in the arcuate surface 159 of the disc 156 is a depression 167 into which the pin 164 normally extends. The relationship between the depression 167, the disc 156, and the valve 122 is such that when the valve 122 is in its normal position, one of the fingers of the disc, such as the finger 158, is in contact with the boss 160, and the pin 164 rests in the depression 167.

Returning now to a description of the association between the plurality of gate controlling elements 93, 94, 95, and 96, and the gate members, with reference to Figs. 3, 4, 5, and 6, we show the supporting member 92 as being provided on each end thereof with bearings 170 and 171. Formed on the supporting member substantially at the center thereof is a bearing 172. Journalled in the bearings 170 and 171 with their respective inner ends journalled in the bearing 172, as shown, is a pair of stub shafts 173 and 174. The outer end of the shaft 173 projects through the bearing adjacent the outer ends of the cylinders 97 of the elements 93 and 94 and intermediate the axes thereof while the shaft 174 projects outwardly in a similar manner adjacent the outer ends of the cylinders of the elements 95 and 96, as clearly shown in Figs. 3 and 4.

Keyed to the outer end of the shaft 173, as shown, is a lever 180 which is pivotally connected at its outer end to the connecting rod 99 of the piston 98 associated with the operating element 93. Also keyed to the shaft 173 is a lever 181 to the outer end of which is pivotally connected one end of a link 182, the other end of the link being connected to the gate member of one of the bins, such as the bin 15.

Secured to a sleeve 183 surrounding the shaft 173, as shown in Fig. 4, is a lever 184, the outer end of which is pivotally connected to the connecting rod 99 associated with the adjacent operating element 94. The sleeve 183 and the lever 184 secured thereto are fully rotatable relative to the shaft 173 and the bearing 170. Likewise secured to the sleeve 183 is a lever 185, to the outer end of which is pivotally secured one end of a link 186, the other end of this link being pivotally connected to one of the gate members 21, such as the gate member associated with the bin 16.

The operating elements 95 and 96 are respectively connected to the gate members of the bins 17 and 18 in identically the same manner as the elements 93 and 94 are connected to the gate members of the bins 15 and 16, there being levers 190 and 191 keyed to the shaft 174, the former lever being pivoted to the connecting rod 99 associated with the element 95, and the latter lever being connected by a link 192 to the gate member of the bin 17. Levers 193 and 194 are secured to a sleeve similar to the sleeve 183, the former lever being connected to the connecting rod 99 associated with the element 96 and the latter lever being connected by a link 195 to the gate member of the bin 18.

As was before stated, the fluid supply pipe 88 leading from the master sylphon 80 is connected in parallel to each of the sylphons 132 of the operating elements 93, 94, 95, and 96, and the fluid inlet orifices 114 of each of the valve chambers 113 of these operating elements is connected in parallel to a steam manifold 115, diagrammatically shown in Fig. 11. As shown also in this figure, the discharge port 108 of one of the elements, such as the element 93, is connected by a fluid conducting means in the form of a pipe 200 to an exhaust member 201. The valve chambers 113 of each of the operating elements are connected in series in the following manner. The relay duct 110 of the element 93 is connected by a pipe 202 to the discharge port 108 of the element 94, the relay duct 110 of the element 94 is connected by a pipe 203 to the discharge port 108 of the element 95, the relay duct 110 of the element 95 is connected by a pipe 204 to the discharge port 108 of the element 96, and the relay duct 110 of the last element in the series, the element 96 being closed in any suitable manner, such as by a threaded plug, indicated at 205 in Fig. 11.

The operation of our invention is as follows: With the valve members 122 of each of the operating elements 93, 94, 95, and 96 in their respective normal positions, as shown in Fig. 11, it will be seen that steam from the manifold 115 entering the valve chamber 113 of the element 93 through the orifice 114 will be delivered therefrom through the notches 123, the relay duct 110, the pipe 202, and into the discharge port 108 of the adjacent element 94, from whence it passes through the channel 124, the fluid passage 106, and into the cylinder 97 associated therewith, as indicated by the arrows "A", forcing the piston 98 outwardly and holding the gate member of the bin 16 connected thereto in closed position. Likewise, steam from the manifold 115 entering the chambers 113 of the elements 94 and 95 is delivered in the same manner to the cylinders 97 of the adjacent elements, forcing the pistons 98 associated with the elements 95 and 96 outwardly to hold the gate members 20 of the bins 17 and 18, respectively, in their closed positions. It will be seen that the valve 122 of the element 93 in its normal position places the cylinder 97 thereof in open communication with the exhaust member 201 through the pipe 200, the discharge port 108, the channel 124, and the fluid passage 106. This allows the gate member 21 associated with the bin 15 to be swung to its open position indicated by the dotted lines "B" of Fig. 3, by manipulating the manual push rod 25 connected thereto. The opening movement of the gate member 21 is transmitted through the associated link 182 to the levers 181 and 180, which respectively move to their dotted line positions indicated at "C" in Fig. 3. The movement of these levers is transmitted to the piston 98 of the operating element 93, moving this piston inwardly in the cylinder 97 into the position in which it is shown in solid lines in Fig. 6.

When the gate member 21 of the bin 15 is thus opened, material from the bin 15 flows into the weigh-hopper 39. As this material flows into the weigh-hopper the increasing weight thereof is registered through the weigh-beam 35, the ends 32 of the arms 31 swinging downwardly and the lever ends 33 and the cross member 34 swinging upwardly, as correspondingly indicated by the arrows "D" and "E" of Fig. 3. This upward movement of the cross member 34, the member 34 being connected to the mechanism of the scale enclosed in the housing 67, actuates the mechanism of the scale to weigh the material being delivered into the weigh-hopper, the weight being registered on the scale dial 68 by the pointer 69 in a well known manner. The upward movement of the cross member 34 of the weigh-beam 35 and the consequent upward movement of the housing 67 relative to the bracket member 60 decreases the volume of the chamber 73 and thus compresses the master sylphon 80. As the compression of the sylphon 80 occurs, oil or other suitable fluid is expelled under pressure from the interior thereof into the pipe 88 and is delivered simultaneously to the openings 136 communicating with the interior of the sylphons 132 of each of the operating elements 93, 94, 95, and 96.

As before stated, the sylphons 132 of each of the elements 93, 94, 95, and 96 are adjusted by means of the spring 140 and the nut 139 to respond to certain various fluid pressures, so that when the fluid pressure in the pipe 88 is built up to a sufficient point, subject to the increasing weight of material in the weigh-hopper, to expand the sylphon 132 in the element 93, the fluid pressure will not be sufficiently great to affect the sylphons 132 of the operating elements 94, 95, and 96, respectively, associated with the closed gate members of the bins 16, 17, and 18. As the fluid pressure is built up in the pipe 88 to a point sufficiently great to cause the sylphon 132 of the element 93 associated with the bin 15 to begin to expand, this expansive movement is resisted by the valve tripping mechanism 155, the frictional engagement of the pin 164 with the depression 167 and the tension of the spring 166 being such that a retarding force is set up against the expansion of the sylphon. When the fluid pressure is built up in the pipe 88 to a point sufficiently great to overcome this retarding force, the excess of pressure therein will cause the sylphon to quickly expand, causing the arm 150 to move in the direction of the arrow "F" and by reason of the connecting link 152 and crank 153 causing the disc 156 to snap from the position shown in solid lines in Fig. 7 to the position indicated by the dotted lines "G" of this figure, which rotates the valve member 122 through the shaft 121 to the position indicated by the dotted lines "H" of Figs. 8 and 9, and in the diagram of Fig. 11.

It will be seen that with the valve 122 of the operating element 93 in the position "H", the inlet orifice 114 communicates with the cylinder 97 through the notch 123 and the fluid passage 106, thus delivering steam under pressure into the cylinder 96 and forcing the piston 98 outwardly. The outward movement of the piston 98 and the connecting rod 99 returns levers 180 and 181, and the link 182 from the positions indicated by the dotted lines "C" in Fig. 3 to their respective normal positions shown by solid lines in this figure, thus moving the gate 21 of the bin 15 from its open position "B" to its normal closed position.

While the valve 122 of the operating element 93 is in the position "H", the relay duct 110 thereof communicates with the exhaust member 201 through the channel 124, the discharge port 108, and the pipe 200; therefore the steam pressure in the cylinder 97 of the adjacent element 94 will be exhausted through the fluid passage 106, the channel 124, the discharge port 108 of the valve associated with the element 94, the pipe 202, and the relay duct 110, the channel 124 and the discharge port 108 of the valve associated with the element 93. With the steam thus exhausted from the cylinder 97 of the element 94, the gate member 21 of the bin 16 is free to be opened by the rod 25 connected thereto, the opening of this gate moving the associated levers 184 and 185 and the link 186 to the respective positions in which they are shown in dotted lines "K" of Fig. 3.

The operation of the operating element 94 associated with the bin 16 and also the operation of the elements 95 and 96 associated with the succeeding bins 17 and 18, is identical with the operation of the element 93 just described.

From the above described operation of the operating element 93 with particular reference to the manner in which the elements 93, 94, 95, and 96 are connected in series by the pipes 202, 203, and 204, it should be clearly understood that as the element 93 is actuated to close the gate member 21 of the bin 15, the cylinder 97 of the element 94 is exhausted to allow the gate of the bin 16 to be opened. Likewise, when the element 94 is actuated to close the gate of the bin 16, the cylinder 96 of the element 95 is exhausted to allow the gate of the bin 17 to be opened. In the same manner, the steam pressure in the cylinder 97 of the element 96 is exhausted to allow the gate of the bin 18 to be opened as the element 95 is operated to close the gate of the bin 17, the successive operation of the elements 93, 94, 95, and 96 being subject to the increasing weight of the material delivered from the successively opened gate members of the bins 15, 16, 17, and 18.

In the drawings and description disclosing this invention we have purposely omitted numerous details of construction and the description thereof that were not essential to the operation of the invention and have shown only a single operative mechanism for operating the control means and the gate operating means of the apparatus. It should be understood, however, that we do not wish to limit our invention to any of the details of construction disclosed herein, as the true scope of our invention is defined by the following claims.

We claim as our invention:

1. An automatic gate closer for use with a weighing device of the character described having a receiving-hopper equipped with a delivery opening, a weigh-hopper placed to receive material from said opening of said receiving-hopper, a gate member for said opening, and means for opening said gate member, including: a compressible container adapted to be filled with a liquid and being connected to said weigh-hopper so that the liquid in said container will be placed under pressure proportionate to the weight of material received in said weigh-hopper from said receiving-hopper; a cylinder-piston mechanism equipped with a valve for controlling the flow of an actuating fluid thereinto, said mechanism having a moving part connected to said gate member; an expansible chamber member connected to said container so as to be expanded by the pressure of liquid therein; yieldable means resisting the expansion of said expansible chamber member; and means connecting said expansible chamber member to said valve so as to operate the valve in a manner to produce a pressure of said actuating fluid in said cylinder-piston mechanism in a direction to move said moving part thereof so as to close said gate member, said yieldable means being adjustable so as to yield in response to a selected liquid pressure in said expansible chamber member.

2. An automatic gate closer for use with a weighing device of the character described having a receiving-hopper equipped with a delivery opening, a weigh-hopper placed to receive material from said opening of said receiving-hopper, a gate member for said opening, and means for opening said gate member, including: a compressible container adapted to be filled with a fluid and being connected to said weigh-hopper so that the fluid in said container will be placed under pressure proportionate to the weight of material received in said weigh-hopper from said receiving-hopper; a cylinder-piston mechanism equipped with a valve for controlling the flow of an actuating fluid thereinto, said mechanism having a moving part connected to said gate member; an expansible chamber member connected to said container so as to be expanded by the pressure of fluid therein; yieldable means resisting the expansion of said expansible chamber member; means connecting said expansible chamber member to said valve so as to operate the valve in a manner to produce a pressure of said actuating fluid in said cylinder-piston mechanism in a direction to move said moving part thereof so as to close said gate member, said yieldable means being adjustable so as to yield in response to a selected fluid pressure in said expansible chamber member; and a quick releasing detent means connected to said expansible chamber member so as to resist expansion thereof with a fixed reaction and to suddenly release when this action is overcome, whereby to produce a substantially instantaneous operation of said valve.

3. An automatic gate closer for use with a weighing device of the character described having a receiving-hopper equipped with a delivery opening, a weigh-hopper placed to receive material from said opening of said receiving-hopper, a gate member for said opening, and means for opening said gate member, including: a compressible container adapted to be filled with a liquid and being connected to said weigh-hopper so that the liquid in said container will be placed under pressure proportionate to the weight of material received in said weigh-hopper from said receiving-hopper; a cylinder-piston mechanism equipped with a valve for controlling the flow of an actuating fluid thereinto, said mechanism having a moving part connected to said gate member; an expansible chamber member connected to said container so as to be expanded by the pressure of liquid therein; yieldable means resisting expansive movement of said expansible chamber member until a predetermined pressure of liquid has been reached in said expansible chamber member; and means connecting said expansible chamber member to said valve so as to operate the valve in a manner to produce a pressure of said actuating fluid in said cylinder-piston mechanism in a direction to move said moving part thereof so as to close said gate member, said yieldable means being adjustable so as to yield in response to a selected liquid pressure in said expansible chamber member.

4. An automatic gate closer for use with a weighing device of the character described having a receiving-hopper equipped with a delivery opening, a weigh-hopper placed to receive material from said opening of said receiving-hopper, a gate member for said opening, and means for opening said gate member, including: a compressible container adapted to be filled with a fluid and being connected to said weigh-hopper so that the fluid in said container will be placed under pressure proportionate to the weight of material received in said weigh-hopper from said receiving-hopper; a power operated actuating device having a control element; an expansible chamber member connected to said container so as to be expanded by fluid received under pressure from said container, said chamber member having a moving part connected to said control element of said actuating device; and yieldable means resisting movement of said moving part until a predetermined pressure of fluid has been reached in said expansible chamber member, the movement of said control element by said moving part causing operation of said actuating device to close said gate member.

5. An automatic gate closer for use with a weighing device of the character described having a receiving-hopper equipped with a delivery opening, a weigh-hopper placed to receive material from said opening of said receiving-hopper, a gate member for said opening, and means for opening said gate member, including: a compressible container adapted to be filled with a fluid and being connected to said weigh-hopper so that the fluid in said container will be placed under pressure proportionate to the weight of material received in said weigh-hopper from said receiving-hopper; a power operated actuating device having a control element; an expansible chamber member connected to said container so as to be expanded by fluid received under pressure from said container, said chamber member having a moving part connected to said control element of said actuating device; yieldable means resisting movement of said moving part until a predetermined pressure of fluid has been reached in said expansible chamber member, the movement of said control element by said moving part causing operation of said actuating device to close said gate member; and a quick releasing detent means also resisting the expansive movement of said chamber member with a fixed reaction and operating to suddenly release when this reaction is overcome, whereby to produce an instantaneous operation of said control element.

6. An automatic gate operating means adapted for use with a weighing device of the character described having a first bin and a second bin, a gate for each of said bins, and a weigh-hopper in position to receive material from said bins, including first and second gate-operating elements, each comprising a fluid-expanded member connected to its associated gate, a valve chamber, a fluid passage connecting said valve chamber to said fluid-expanded member, a discharge port leading from said valve chamber, a relay duct leading from said valve chamber, a fluid inlet for said valve chamber, and a valve member in said valve chamber adapted to two positions of operation, the first position connecting said inlet to said relay duct and said fluid passage to said discharge port, and the second position connecting said inlet to said fluid passage and said discharge port to said relay duct; a source of fluid under pressure connected to each of said inlets; a conduit connecting said relay duct of said first gate-operating element to said discharge port of said second gate-operating element so that when said valve members are in said first position, fluid will flow from said valve chamber of said first gate-operating element to the fluid-expanded member of said second gate-operating element to expand the same and hold the gate connected therewith in closed position, said fluid-expanded member of said first gate-operating element being at this time connected to its discharge port so as to permit opening of the gate connected thereto; and means, operative in response to weight of material in said weigh-hopper, for consecutively moving said valve members from their first to second positions.

7. A device of the character described, including: first and second operating elements, each comprising a fluid-expanded member, a valve chamber, a fluid passage connecting said valve chamber to said fluid-expanded member, a discharge port leading from said valve chamber, a relay duct leading from said valve chamber, a fluid inlet for said valve chamber, and a valve in said valve chamber adapted to two positions of operation, the first position of operation connecting said inlet to said relay duct and said fluid passage to said discharge port, and the second position connecting said inlet to said fluid passage and said discharge port to said relay duct; a source of fluid under pressure connected to each of said inlets; a conduit connecting said relay duct of said first operating element to said discharge port of said second operating element so that when said valves are in said first position of operation fluid will flow from the valve chamber of said first operating element to the fluid-expanded member of said second operating element to expand the same, the fluid-expanded member of said first operating element being at this time connected to its discharge port; and means for successively moving said valves from their first to their second positions of operation.

8. An operating element of the character described, including: a fluid-expanded member; walls forming a valve chamber; fluid passage means connecting said valve chamber to said fluid-expanded member; walls forming a discharge port for said valve chamber; walls forming a relay duct leading from said valve chamber; means for feeding fluid under pressure to said valve chamber; and a valve member in said valve chamber, said valve member having two positions of operation, the first position of operation connecting said valve chamber to said relay duct and said fluid passage means to said discharge port, and the second position of operation connecting said valve chamber to said fluid passage means and said discharge port to said relay duct.

9. A device of the character described, including: an expansible member adapted to be expanded in a direction corresponding to its axis in response to internal fluid pressure; a stationary wall at one end of said expansible member; a movable end wall at the opposite end of said expansible member; stop means for limiting the inward movement of said movable wall; a spring for forcing said movable end wall inwardly to engage said stop means; a movable control member adjacent said movable end wall; means connecting said movable end wall to said control member so as to hold said control member in a primary position when said end wall is in engagement with said stop means, and in secondary position when said expansible member moves said end wall outwardly against the force of said spring; and means for adjusting said spring to vary the force which it exerts against said movable end wall, so as to vary the fluid pressure required in said expansible member to move said movable end wall outwardly from engagement with said stop means.

10. A device of the character described, including: an expansible member adapted to be expanded in a direction corresponding to its axis in response to internal fluid pressure; a stationary wall at one end of said expansible member; a movable end wall at the opposite end of said expansible member; stop means for limiting the inward movement of said movable wall; a spring for forcing said movable end wall inwardly to engage said stop means; a movable control member adjacent said movable end wall; means connecting said movable end wall to said control member so as to hold said control member in a primary position when said end wall is in engagement with said stop means, and in secondary position when said expansible member moves said end wall outwardly against the force of said spring; means for adjusting said spring to vary the force which it exerts against said movable end wall, so as to vary the fluid pressure required in said expansible member to move said movable end wall outwardly from engagement with said stop means; and quick releasing detent means operatively engaging said control member when it is in said primary position, said detent means resisting the initial movement of said movable end wall in outward direction.

11. An automatic gate closer for use with a weighing device having an aggregate hopper with a plurality of bins, each of which is provided with a delivery chute, a weigh-hopper placed to receive material from the delivery chutes and supported by the weigh-beam of a scale, a gate member normally closing each of the chutes and means for separately opening each of the gate members, including: individual gate operating elements adapted to close each of said gate members, each of said elements including a piston movable in a cylinder and connected to one of said gate members; a valve member movable to one position to direct liquid under pressure into said cylinder to move said piston to close said gate member connected thereto and movable to a second position to exhaust said liquid pressure from said cylinder, and pressure-responsive operating means for moving said valve member; and pressure-responsive controlling means associated with said weigh-beam and operable by the movement thereof to actuate said operating means of each of said elements to move said valve members to direct fluid pressure into said cylinder to close said gate members when the weight of the material delivered from each of said bins into said weigh-hopper reaches a predetermined weight as registered through said weigh-beam on said scale.

12. An automatic gate closer for use with a weighing device of the character described having a receiving-hopper equipped with a delivery opening, a weigh-hopper placed to receive material from said opening of said receiving-hopper, a gate member for said opening, and means for opening said gate member, including: a fluid container; means operated by the change in weight of the contents of the weigh-hopper for placing a pressure on the fluid in said container proportionate to the weight of the contents of the weigh-hopper; and mechanism associated with said gate member, connected to said fluid container and controlled by the pressure of fluid in said container and operating to close said gate member when the weight of the material delivered from said receiving-hopper to said weight-hopper reaches a predetermined weight.

13. An automatic gate closer for use with a weighing device of the character described having a plurality of receiving-hoppers, each of which is equipped with a delivery opening, a weigh-hopper placed to receive material from said openings, a gate member for each of said openings and means for opening individually each gate member, including: a fluid container; means operated by the change in weight of the material in the weigh-hopper for placing a pressure on the fluid in said container proportionate to the weight of the material in said weigh-hopper; and mechanism associated with each of said gate members, connected to said container and controlled by the pressure of fluid in said container and operating to prevent the opening of said associated gate member until the weight of material in said weigh-hopper reaches a predetermined value and to close said gate member when the weight of material in said weigh-hopper reaches a different predetermined value.

14. An automatic gate closer for use with a weighing device of the character described having a receiving-hopper equipped with a delivery opening, a weigh-hopper placed to receive material from said opening of said receiving-hopper, a gate member for said opening, and means for opening said gate member, including: a fluid container; means operated by the change in weight of the contents of the weigh-hopper for placing a pressure on the fluid in said container proportionate to the weight of the contents of the weigh-hopper; and mechanism associated with said gate member and operable to close said gate member when the weight of the contents of said weigh-hopper reaches a predetermined value, said mechanism including a fluid-expanded member connected to said fluid container and having a part which is moved by the pressure of said fluid, and an actuating element connected to said gate member and controlled by the movement of said part of said fluid-expanded member.

15. An automatic gate closer for use with a weighing device having a plurality of receiving-hoppers each with a delivery opening and a gate member for each opening, a weigh-hopper connected to a weigh-beam which indicates on a scale the weight of the contents of said weigh-hopper, and means for separately opening each of the gate members, including: a fluid container; means operated by the movement of the weigh-beam for placing pressure on the fluid in said container proportionate to the weight of material in the weigh-hopper; fluid pressure responsive means associated with each of said gates, each of such means being connected to said fluid container and operating to close each of the gate members when the weight of material in said weigh-hopper reaches a predetermined value; and means for preventing the opening of one of said gates until the other of said gates has been closed.

16. An automatic gate closer for use with a weighing device having a plurality of receiving-hoppers each with a delivery opening and a gate member for each opening, a weigh-hopper connected to a weigh-beam which indicates on a scale the weight of the contents of said weigh-hopper, and means for separately opening each of the gate members, including: a fluid container; means operated by the movement of the weigh-beam for placing pressure on the fluid in said container proportionate to the weight of material in the weigh-hopper; actuating means, fluid pressure operated, associated with each of the gate members; a source of fluid pressure for said actuating means; and control means associated with each of said actuating means and responsive to the fluid pressure in said fluid container to connect said source of fluid pressure to each of said actuating means for closing said gate members successively upon the weight in said weigh-hopper reaching predetermined successive values.

MARTIN MADSEN.
ALBERT H. ZIEGLER.
HARRY B. PARROT.
KAY A. RICHARDSON.